United States Patent [19]

Davies

[11] 4,298,222
[45] Nov. 3, 1981

[54] TUBE COUPLING

[75] Inventor: Irving W. Davies, North Olmsted, Ohio

[73] Assignee: Jaco Manufacturing Company, Berea, Ohio

[21] Appl. No.: 171,431

[22] Filed: Jul. 23, 1980

[51] Int. Cl.³ .............................................. F16L 19/08
[52] U.S. Cl. .................................. 285/341; 285/382.7
[58] Field of Search ...................... 285/341, 382.7, 342, 285/249, 248

[56] References Cited

U.S. PATENT DOCUMENTS

| 3,501,177 | 3/1970 | Jacobs | 285/382.7 X |
| 3,888,522 | 6/1975 | Moreiras | 285/382.7 X |
| 4,025,093 | 5/1977 | Leczycki | 285/382.7 X |

FOREIGN PATENT DOCUMENTS

| 1475764 | 3/1969 | Fed. Rep. of Germany | 285/341 |
| 1098084 | 1/1968 | United Kingdom | 285/341 |
| 1530205 | 10/1978 | United Kingdom | 285/341 |

Primary Examiner—Thomas F. Callaghan
Attorney, Agent, or Firm—Maky, Renner, Otto & Boisselle

[57] ABSTRACT

A flareless tube coupling having screwed together body and nut members provided with oppositely tapered cam surfaces operative upon screwing together of the body and nut members to contract a tapered C-shaped grip ring within the nut cam surface into gripping engagement with a tube therewithin and to urge the axially inner end of a thin tubular sleeve into sealed engagement with the body cam surface and into gripping and sealing engagement with the tube, the large end of the grip ring having a plane end surface in engagement with the plane end surface of a radially enlarged collar at the axially outer end of the sleeve. In addition, the nut member has a shoulder at the large end of its cam surface which engages the radially outer portion of the plane end surface of the collar to limit contraction of the grip ring and to positively restrain the sleeve from axial outward movement with respect to the body member under the influence of fluid pressure in the coupling assembly or upon imposition of tensile pulling apart forces exerted on the tube and body member.

The coupling herein is further characterized in that the C-shaped grip ring is uniformly radially and circumferentially contracted to substantially circular form with the circumferentially extending gripper teeth of sawtooth configuration terminating in sloping edges which fade out to the crests in spaced relation from the respective ends of the ring to preclude the possibility of circumferential pinching of the tube material during assembly of the coupling.

3 Claims, 5 Drawing Figures

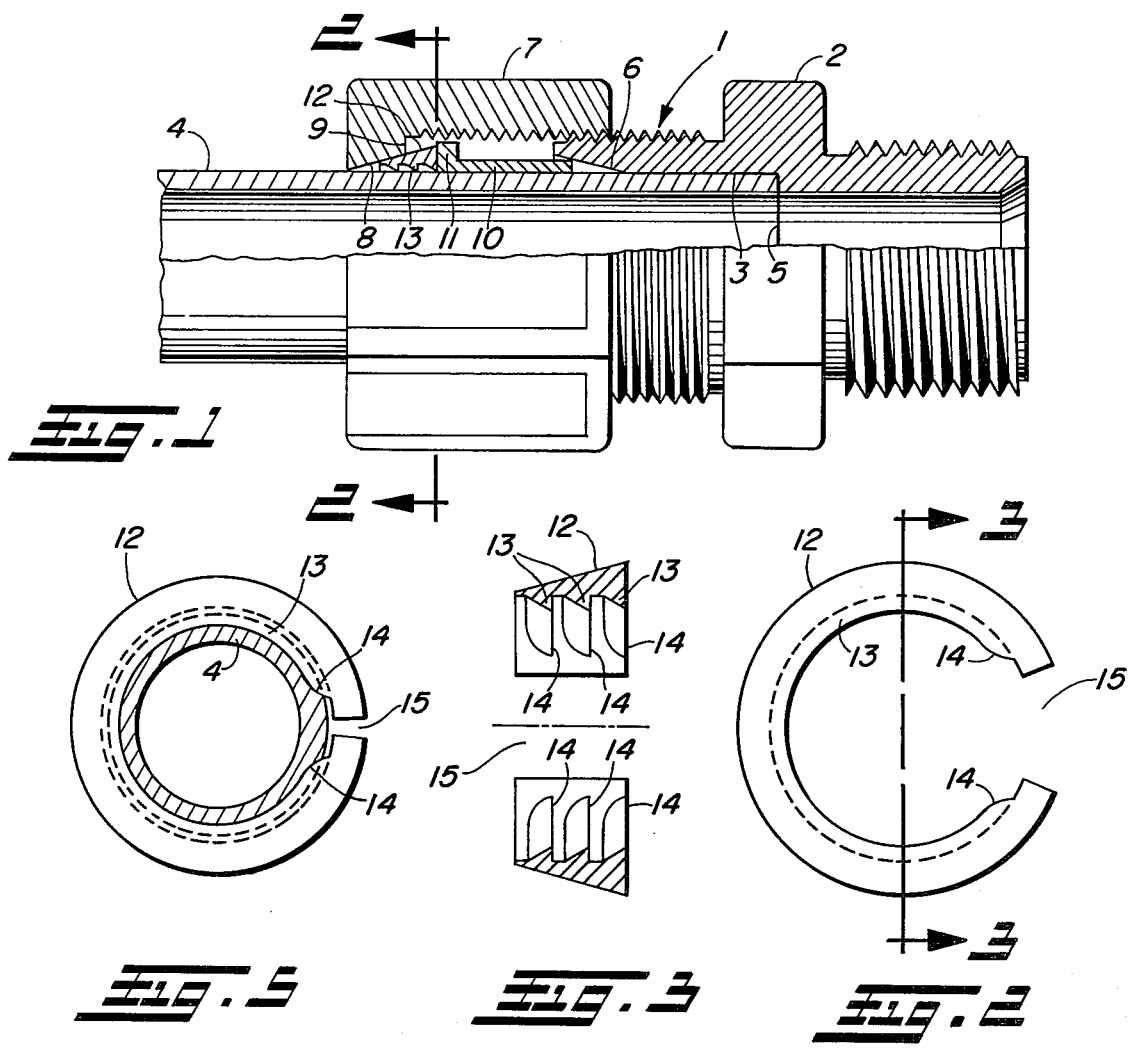
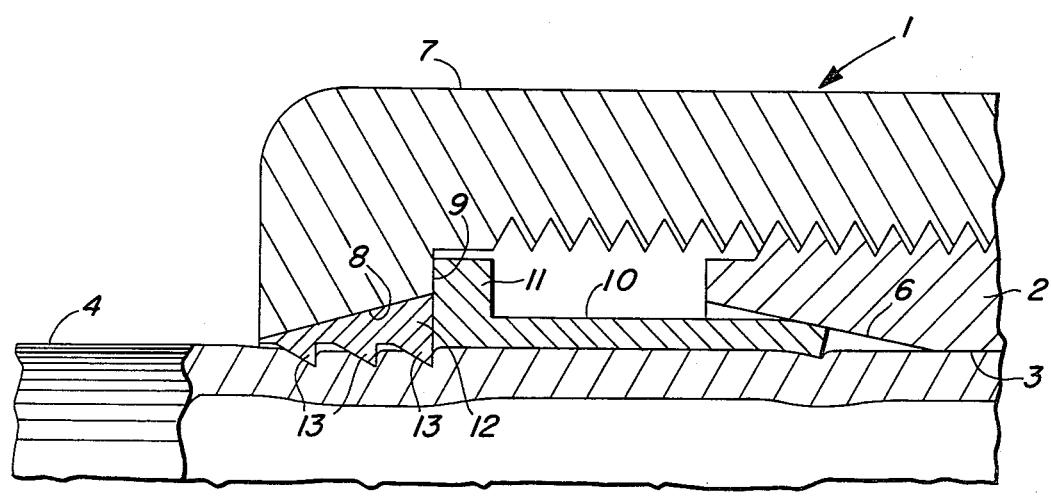

TUBE COUPLING

BACKGROUND OF THE INVENTION

It is known to provide flareless tube couplings having a one piece ferrule or sleeve which, at its axially inner end, is radially contracted by a body cam surface into sealed engagement with the body cam surface and into gripping and sealing engagement with the tube and which, at its axially outer end, has several axially extending slots to provide for contraction of the axially outer end portion of the sleeve by a nut cam surface into gripping engagement with the tube. In such construction, the axial slots must extend axially inwardly a substantial distance beyond the nut cam surface to enable bending of the arcuate fingers into gripping engagement with the tube at a region axially outwardly from the axially inner tube gripping and sealing end of the sleeve. Furthermore, it is difficult to bend the arcuate fingers to a progressively shorter radius as they are bent inwardly into tube gripping engagement.

SUMMARY OF THE INVENTION

A flareless tube coupling in which a radially enlarged collar of a tube gripping and sealing sleeve and the large end of a separate externally tapered C-shaped grip ring having internal circumferentially extending tube gripping teeth have juxtaposed plane annular faces for uniform contraction of the grip ring in circular form by engagement of the nut cam surface with the grip ring therewithin. The nut has a shoulder to engage the radially outer portion of the collar face to limit the contraction of the grip ring and to positively restrain the sleeve from axial outward movement with respect to the coupling body thereby to retain the grip and seal of said sleeve with the body and with the tube despite high fluid pressures or severe pulling apart forces on the tube and body.

The tube coupling herein is further characterized in that the circumferential tube gripping teeth of the grip ring gradually fade out before the ends of the gap of the C-shaped grip ring thus to preclude the possibility of circumferential pinching of the tube during contraction of the grip ring and in the contracted condition of the grip ring.

BRIEF DESCRIPTION OF THE DRAWING

FIG. 1 is a longitudinal cross-section view of a tube coupling embodying the present invention and showing the coupling assembly in light finger-tight condition.

FIG. 2 is a cross-section view as taken along the line 2—2 but omitting the tube and nut.

FIG. 3 is a cross-section view taken substantially along the line 3—3 FIG. 2.

FIG. 4 is a fragmentary cross-section view on enlarged scale showing the normally tightened condition of the tube coupling in which the axially inner end of the thin continuous tubular sleeve is in sealed engagement with the body cam surface and in gripping and sealing engagement with the tube and in which the grip ring has been contracted into gripping engagement with the tube spaced outwardly axially of the gripping and sealing area of the sleeve and showing the radially enlarged collar of the sleeve in engagement with a shoulder in the nut to limit the contraction of the grip ring and to prevent axial outward movement of the tube gripping and sealing sleeve.

FIG. 5 is a cross-section view similar to FIG. 2 except showing the grip ring in contracted condition with the teeth therein in gripping engagement with the tube.

DETAILED DESCRIPTION OF A PREFERRED EMBODIMENT

The tube coupling assembly 1 herein comprises a body member 2 having a bore 3 for receiving the end portion of a tube 4 and providing a shoulder 5 engaging the end of the tube. The bore 3 terminates in a tapered cam surface 6 preferably of about 15° taper (30° included angle).

In threaded engagement with the body member 2 is a nut member 7 having an oppositely tapered cam surface 8 also preferably of 15° taper which at its large end terminates in a shoulder 9.

Surrounding the tube 4 is an elongated thin sleeve 10 having its axially inner end engageable with the body cam surface 6 and having a radially enlarged collar 11 at its axially outer end which is of diameter larger than the large end of the cam surface 8 in the nut 7. The wide plane annular end face of the collar 11 is engaged by the corresponding wide plane annular end face of a tapered C-shaped grip ring 12 of the same taper as cam surface 8 which is initially of substantially the same diameter at its large end as the collar 11 and which has interior circumferential tube gripping teeth 13 of generally saw tooth configuration which gradually fade out along the lines 14 radially and circumferentially to the crest diameter circumferentially spaced from the respective ends of the ring 12 at gap 15. In its unstressed condition, the inside diameter of the grip ring 12 at the sharp edges of the teeth 13 is substantially equal to the diameter of the tube 4 and the axial length of the grip ring 12 is substantially equal to the axial distance from the shoulder 9 of the nut 7 to the axially outer end face thereof so that in the tightened condition of the coupling as shown in FIG. 4 the axially outer end of the grip ring 12 will be substantially flush with the axially outer end surface of the nut 7 and the shoulder 9 of the nut 7 will be engaged with the radially outer portion of the collar 11 end surface thus to provide a sharp increase in torque in the tightening of the nut 7 to denote the properly tightened condition of the coupling 1.

By comparing FIGS. 2 and 5 it will be seen that as the grip ring 12 is progressively contracted the teeth 13 will be uniformly embedded into the surface of the tube 4 and the relieved portions 14 of the teeth 13 will move not only radially inwardly but in a circumferential direction and by reason of the sharp edges gradually fading out along lines 14 pinching of the tube 4 is precluded.

In the event of the severe over-tightening of the coupling 1 no harm will be done in that the ends of the grip ring 12 will engage one another closing gap 15 and the collar 11 may be flexed toward the right as viewed in FIG. 4 to provide an additional spring tension restraining the sleeve 10 from axial outward displacement with reference to the body 2.

In a preferred form of the invention, the nut 7, body 2, grip ring 12, and sleeve 10 are molded of nylon or like plastic material for gripping and sealing a plastic tube 4 of somewhat softer material to achieve firm gripping and sealing as clearly shown in FIG. 4

The embodiments of the invention in which an exclusive property or privilege is claimed are defined as follows:

1. A tube coupling comprising nut and body members in screw threaded engagement with each other defining a tube receiving bore and an annular chamber surrounding a tube adapted to be inserted into such bore, said nut and body members having oppositely tapered cam surfaces constituting the end walls of said chamber which move toward each other upon screwing together of said nut and body members; a tube-embracing sleeve in said chamber having a radially contractible axially inner end portion engageable with the cam surface of said body member and having a radially enlarged collar at its axially outer end portion; and an externally tapered radially contractible C-shaped circular grip ring in said chamber engageable with the cam surface of said nut member and having internal circumferentially extending teeth; said collar and large end of said grip ring having interengaged plane annular end faces to transmit axial inward force from said grip ring to said sleeve to effect radial contraction of said axially inner end portion by the cam surface said body member into gripping and sealing engagement with the tube and to permit radial contraction of said grip ring to smaller diameter by the cam surface of said nut member whereat said teeth are embedded in the tube in gripping engagement therewith; said teeth having terminal sloping portions which fade out circumferentially and radially to the major diameter of said teeth in circumferentially spaced relation from the respective ends of said grip ring to preclude pinching of the tube when said grip ring is radially contracted to such smaller diameter.

2. The tube coupling of claim 1 wherein said teeth have acute angle sharp edges embedded in the tube; said sharp edges continuing through said terminal sloping portions at progressively increasing diameter from the minor diameter to the major diameter of said teeth.

3. The tube coupling of claim 1 wherein said nut member, at the large end of its cam surface, has a shoulder which, upon screwing together of said nut and body members, engages the radially outer portion of the annular end face of said collar; wherein the axially outer end of said grip ring is substantially flush with the axially outer end of said nut member when said shoulder is engaged with said collar; and wherein additional screwing together of said nut and body members transmits axial force directly from said nut member to said sleeve and additionally contracts said grip ring to deepen the embedding of said teeth into said tube; such additional contraction being limited by closing of the gap between the ends of said grip ring without pinching of the tube therebetween.

* * * * *